US010473037B2

(12) United States Patent
Ortiz et al.

(10) Patent No.: US 10,473,037 B2
(45) Date of Patent: Nov. 12, 2019

(54) PASSIVELY-DRIVEN BLEED SOURCE SWITCHING

(71) Applicant: United Technologies Corporation, Farmington, CT (US)

(72) Inventors: Jonathan Ortiz, Torrance, CA (US); William K. Ackermann, East Hartford, CT (US); Matthew P. Forcier, South Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 184 days.

(21) Appl. No.: 15/601,563

(22) Filed: May 22, 2017

(65) Prior Publication Data

US 2018/0334966 A1 Nov. 22, 2018

(51) Int. Cl.
*F01D 9/06* (2006.01)
*F02C 9/18* (2006.01)
*F02C 7/18* (2006.01)
*F02C 6/08* (2006.01)

(52) U.S. Cl.
CPC ............... *F02C 9/18* (2013.01); *F01D 9/065* (2013.01); *F02C 6/08* (2013.01); *F02C 7/18* (2013.01); *F05D 2260/20* (2013.01); *F05D 2260/50* (2013.01); *F05D 2270/3015* (2013.01)

(58) Field of Classification Search
CPC ...... F02C 6/08; F02C 7/12; F02C 7/18; F02C 9/18; F04D 27/0207; F04D 27/0215; Y02T 50/676
See application file for complete search history.

(56) References Cited

U.S. PATENT DOCUMENTS

| 4,102,595 A | * | 7/1978 | Wibbelsman | ....... F04D 27/0223 415/1 |
| 6,615,574 B1 | * | 9/2003 | Marks | ....................... F02C 7/18 60/772 |
| 6,910,851 B2 | | 6/2005 | Franconi et al. | |

(Continued)

FOREIGN PATENT DOCUMENTS

| EP | 2476883 A2 | 7/2012 |
| WO | 2015178897 A1 | 11/2015 |

OTHER PUBLICATIONS

European Search Report Issued in EP Application No. 18173670.3, dated Feb. 5, 2019, 7 Pages.

*Primary Examiner* — Patrick Hamo
(74) *Attorney, Agent, or Firm* — Cantor Colburn LLP

(57) ABSTRACT

A bleed air cooling system for a gas turbine engine includes one or more bleed flowpaths operably connected to a bleed outlet to divert a bleed airflow from a gas turbine engine flowpath. Each bleed flowpath includes two or more bleed ports to divert a bleed airflow from a gas turbine engine flowpath, a bleed duct configured to convey the bleed airflow from the two or more bleed ports to the bleed outlet, and a delta-pressure valve located at each bleed port of the two or more bleed ports configured to move between an opened position and a closed position in response to a difference between a first pressure upstream of the delta-pressure valve and a second pressure downstream of the delta pressure valve. The bleed airflow is selectably conveyed through a bleed port of the two or more bleed ports depending on the operation of the associated delta-pressure valve.

16 Claims, 4 Drawing Sheets

(56) References Cited

U.S. PATENT DOCUMENTS

| | | |
|---|---|---|
| 6,931,859 B2 | 8/2005 | Morgan et al. |
| 6,981,841 B2 | 1/2006 | Krammer et al. |
| 7,069,728 B2 * | 7/2006 | Bruno .................... F01D 17/10 415/145 |
| 8,057,157 B2 | 11/2011 | Roush et al. |
| 8,240,153 B2 | 8/2012 | Childers et al. |
| 8,302,407 B2 | 11/2012 | Alecu et al. |
| 8,397,487 B2 | 3/2013 | Sennoun et al. |
| 8,843,253 B1 | 9/2014 | Chapman |
| 8,967,528 B2 | 3/2015 | Mackin et al. |
| 9,062,604 B2 | 6/2015 | Defrancesco |
| 9,097,138 B2 * | 8/2015 | Glahn ..................... F01D 11/04 |
| 9,234,707 B2 | 1/2016 | Mackin et al. |
| 9,261,022 B2 | 2/2016 | Saha et al. |
| 9,382,841 B2 * | 7/2016 | Bruno ...................... F02C 6/08 |
| 9,470,153 B2 | 10/2016 | Suciu et al. |
| 9,482,236 B2 | 11/2016 | Khalid et al. |
| 9,555,893 B2 | 1/2017 | Squier |
| 2013/0164115 A1 | 6/2013 | Sennoun |
| 2013/0192238 A1 | 8/2013 | Munsell et al. |
| 2013/0247584 A1 | 9/2013 | Kasibhotla et al. |
| 2015/0104289 A1 * | 4/2015 | Mackin ................ F04D 27/023 415/1 |
| 2015/0107261 A1 | 4/2015 | Moes et al. |
| 2015/0233291 A1 | 8/2015 | Pelagatti et al. |
| 2015/0233292 A1 | 8/2015 | Pelagatti et al. |
| 2015/0251765 A1 | 9/2015 | Jonqueres et al. |
| 2015/0354465 A1 * | 12/2015 | Suciu ....................... F02C 3/04 60/782 |
| 2016/0003166 A1 * | 1/2016 | Mosley ..................... F02C 7/18 416/95 |
| 2017/0284298 A1 * | 10/2017 | Suciu ....................... F02C 7/18 |
| 2018/0128178 A1 * | 5/2018 | Snape ...................... F02C 6/08 |

* cited by examiner

PASSIVELY-DRIVEN BLEED SOURCE SWITCHING

BACKGROUND

Exemplary embodiments pertain to the art of gas turbine engines. More particularly, the present disclosure relates to cooling of components of the gas turbine engine via bleed air flow.

Gas turbine engines are known and typically include a fan delivering air into a bypass duct as propulsion air. Further, the fan delivers air into a compressor section where it is compressed. The compressed air passes into a combustion section where it is mixed with fuel and ignited. Products of this combustion pass downstream over turbine rotors driving them to rotate.

In a gas turbine engine, cooling air is often provided from the compressor to the turbine section to reduce component temperature in the turbine section and improve overall gas turbine engine operation. In some gas turbine engines, air from the high compressor discharge is passed through a heat exchanger, which may be located in a fan bypass duct and then delivered into the turbine section as cooling air. The air from the downstream most end of the compressor section is at elevated temperatures, relative to air at other portions of the compressor section.

Running the operating temperatures in the turbine section at high temperatures provides efficiency gains in the gas turbine engine; however, the high temperatures are exceeding material limits and are driving the need for improved cooling air. That is, conventional cooling air methods often require large amounts of airflow to provide cooling air at sufficient pressure to be introduced to the highest pressure places of the gas turbine engine and at cool enough temperature to reduce key component temperatures.

BRIEF DESCRIPTION

In one embodiment, a bleed air cooling system for a gas turbine engine includes one or more bleed flowpaths operably connected to a bleed outlet to divert a bleed airflow from a gas turbine engine flowpath. Each bleed flowpath includes two or more bleed ports located at separate axial locations of the gas turbine engine to divert a bleed airflow from a gas turbine engine flowpath, a bleed duct in fluid communication with the bleed ports and configured to convey the bleed airflow from the two or more bleed ports to the bleed outlet, and a delta-pressure valve located at each bleed port of the two or more bleed ports, the delta-pressure valve configured to move between an opened position and a closed position in response to a difference between a first pressure at a first location upstream of the delta-pressure valve and a second pressure at a second location downstream of the delta pressure valve. The bleed airflow is selectably conveyed through a bleed port of the two or more bleed ports depending on the operation of the associated delta-pressure valve.

Additionally or alternatively, in this or other embodiments the delta-pressure valve of each bleed port of the plurality of bleed ports is configured to operate passively.

Additionally or alternatively, in this or other embodiments the axial locations are axial locations of a high pressure compressor section of the gas turbine engine.

Additionally or alternatively, in this or other embodiments the plurality of bleed flowpaths are in flow communication with at least one turbine manifold.

Additionally or alternatively, in this or other embodiments the plurality of bleed flowpaths is two or more bleed flowpaths.

Additionally or alternatively, in this or other embodiments a first delta-pressure valve at a first bleed port of the two or more bleed ports is mechanically connected to a valve at a second bleed port of the two or more bleed ports, such that opening of the first delta-pressure valve forces closure of the second valve via the mechanical connection.

Additionally or alternatively, in this or other embodiments the mechanical connection is a linkage.

In another embodiment, a gas turbine engine includes a compressor section, a turbine section operably connected to the compressor section, and a bleed air cooling system. The bleed air cooling system includes one or more bleed flowpaths operably connected to a bleed outlet to divert a bleed airflow from a gas turbine engine flowpath. Each bleed flowpath includes two or more bleed ports located at separate axial locations of the gas turbine engine to divert a bleed airflow from a gas turbine engine flowpath, a bleed duct in fluid communication with the bleed ports and configured to convey the bleed airflow from the two or more bleed ports to the bleed outlet, and a delta-pressure valve located at each bleed port of the two or more bleed ports, the delta-pressure valve configured to move between an opened position and a closed position in response to a difference between a first pressure at a first location upstream of the delta-pressure valve and a second pressure at a second location downstream of the delta pressure valve. The bleed airflow is selectably conveyed through a bleed port of the two or more bleed ports depending on the operation of the associated delta-pressure valve.

Additionally or alternatively, in this or other embodiments the delta-pressure valve of each bleed port of the plurality of bleed ports is configured to operate passively.

Additionally or alternatively, in this or other embodiments the axial locations are axial locations of a high pressure compressor section of the gas turbine engine.

Additionally or alternatively, in this or other embodiments the plurality of bleed flowpaths are in flow communication with at least one turbine manifold.

Additionally or alternatively, in this or other embodiments the plurality of bleed flowpaths is two or more bleed flowpaths.

Additionally or alternatively, in this or other embodiments a first delta-pressure valve at a first bleed port of the two or more bleed ports is mechanically connected to a second valve at a second bleed port of the two or more bleed ports, such that opening of the first delta-pressure valve forces closure of the second valve via the mechanical connection.

Additionally or alternatively, in this or other embodiments the mechanical connection is a linkage.

In yet another embodiment, a method of cooling one or more components of a gas turbine engine includes selectably urging a bleed airflow through a first bleed port of a plurality of bleed ports each disposed at an axial location of a compressor section of a gas turbine engine, the bleed airflow selectably urged through the first bleed port via selective operation of a plurality of delta-pressure valves located at the plurality of bleed ports, and flowing the bleed airflow through a bleed duct toward a bleed outlet disposed at a cooling location.

Additionally or alternatively, in this or other embodiments the bleed airflow through the first bleed port is stopped, and the bleed airflow through a second bleed port of the plurality of bleed ports is started via selective operation of the plurality of delta-pressure valves in response to a change in an operating condition of the gas turbine engine.

Additionally or alternatively, in this or other embodiments for a given operating condition, bleed airflow is conveyed through only one bleed port of the plurality of bleed ports.

Additionally or alternatively, in this or other embodiments the operating condition is a pressure downstream of the plurality of delta-pressure valves.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
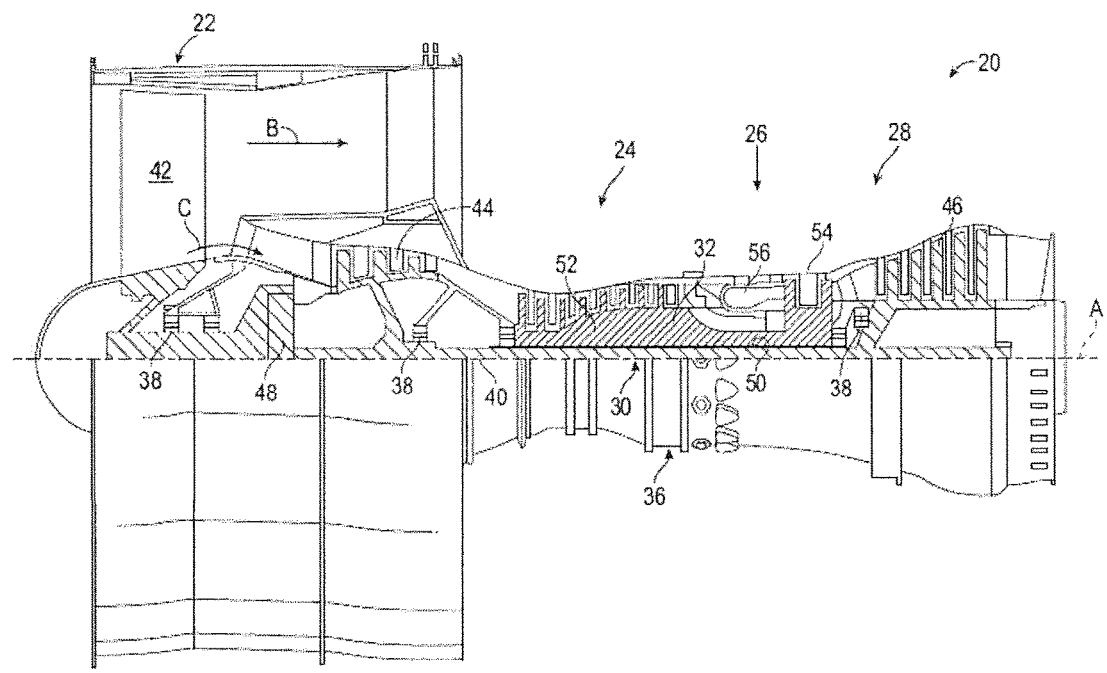
FIG. 1 is cross-sectional view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }° \text{ R})/(518.7° \text{ R})]^{0.5}$. The "Low corrected fan tip speed" as disclosed herein according to one non-limiting embodiment is less than about 1150 ft/second (350.5 m/sec).

Figure 2:
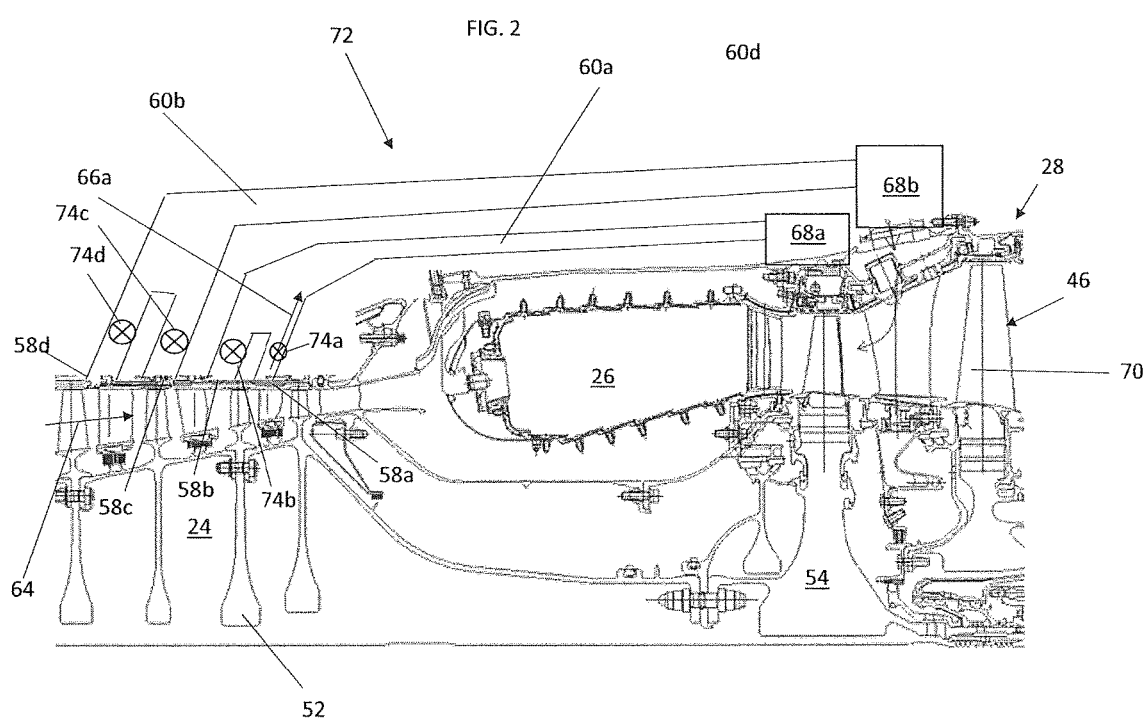
FIG. 2 is a schematic view of an embodiment of a bleed system for a gas turbine engine.

Referring now to FIG. 2, illustrated is an embodiment of a bleed air cooling system 72 for the gas turbine engine 10. In this embodiment, the compressor section 24 includes a plurality of bleed ports 58 each connected to a bleed duct 60.

In some embodiments, each bleed port 58 is located at a unique axial location of the high pressure compressor 52 to divert high pressure compressor airflow 64 from the high pressure compressor 52 into a bleed duct 60 as bleed airflow 66. The bleed airflow 66 is directed downstream along the bleed duct 60 to one or more locations of, for example, the turbine section 28 to provide cooling for one or more components thereat. In the embodiment of FIG. 2, each bleed duct 60 is connected to a turbine manifold 68. The turbine manifold 68 extends at least partially around a perimeter of the turbine section 28 to allow for distribution of the bleed airflow 66 to multiple circumferential locations of the turbine section 28. In some embodiments, the turbine manifold 68 extends completely around the perimeter of the turbine section 28. The bleed airflow 66 flows from the turbine manifold 68 via a bleed outlet 80 to cool one or more components of the turbine section 28, for example, one or more turbine airfoils 70.

For example, FIG. 2 illustrates and embodiment having four bleed ports 58a-58d, with bleed ports 58a and 58b connected to turbine manifold 68a located at, for example, the high pressure turbine 54 via corresponding bleed duct 60a. Likewise, bleed ports 58c and 58d are connected to turbine manifold 68b located at, for example, the low pressure turbine 46 via bleed duct 60b. A valve 74 is positioned at each bleed port 58a-58d to control the flow of bleed air 66 through each of the bleed ports 58a-58d and through bleed ducts 60a, 60b. The valves 74 selectably direct bleed airflow 66 to the turbine manifolds 68a, 68b based on one or more gas turbine engine 10 operating conditions. More specifically, the valves 74 passively control the flow of bleed airflow 66 from the bleed ports 58a-58d to the turbine manifolds 68a, 68b based on operating conditions of the gas turbine engine 10 and cooling needs of the one or more turbine section 28 components. In the present disclosure "passively control" means that the valves 74 act independently, without input from control systems of the like to command opening and closing of the valves 74.

While in the embodiments illustrated and described herein, two turbine manifolds 68 are illustrated with two bleed ports 58 connected to each turbine manifold 68, one skilled in the art will readily appreciate that the present disclosure may be applied to other systems having, for example, three or more turbine manifolds 68, and/or three or more bleed ports 58 connected to a turbine manifold 68. Further, the bleed ports 58 may be located at any compressor 24 location, such as high pressure compressor 52, low pressure compressor 44 or fan 42, with the turbine manifold 68 located to provide cooling to any downstream location, such as high pressure turbine 54 or low pressure turbine 46. Further, in some embodiments, two or more bleed ports 58 may be located at a same axial location of the compressor 24, and may distribute bleed airflow 66 to two or more turbine manifolds 68 at different location of the turbine section 28, such as the high pressure turbine 54 or low pressure turbine 46.

In some embodiments, the valves 74 are delta-pressure valves 74, which are configured to move between an opened and closed position based on a difference between a first pressure at a first location 76 directly upstream of the valve 74 and a second pressure at a second location 78 directly downstream of the valve 74. When the difference is sufficiently high, the valve 74 will open, allowing bleed airflow 66 through the particular bleed port 58 at which the valve 74 is located, with the bleed airflow 66 continuing to the associated turbine manifold 68 for use in cooling. In some embodiments, the valves 74 are configured such that for a given downstream pressure, bleed airflow 66 flows through only one bleed port 58 connected to each turbine manifold 68.

Operation of the bleed air cooling system 72 is further illustrated with reference to FIGS. 2-5. Referring to FIG. 2, at a first downstream pressure, Pa, a pressure difference at valve 74a located at bleed port 58a will open, allowing bleed airflow 66a to flow through bleed port 58a and bleed duct 60a to the turbine manifold 68a. Valve 74b, located at bleed port 58b, remains in the closed position.

Figure 3:
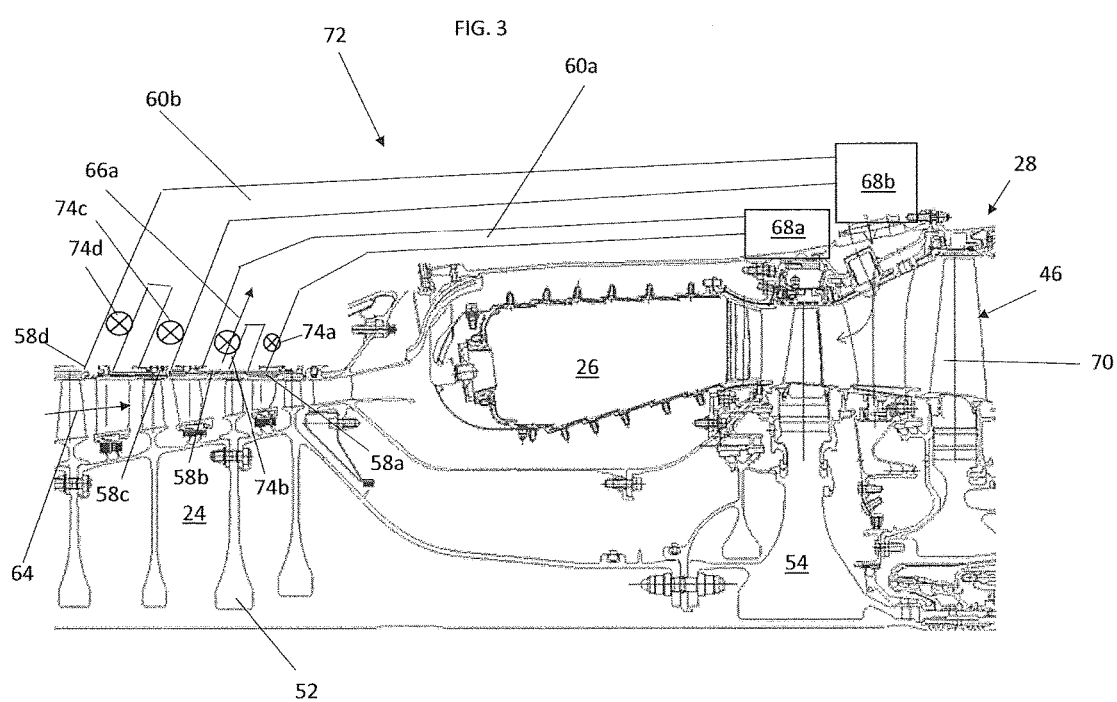
FIG. 3 is a schematic view of operation of a bleed system for a gas turbine engine.

During operation of the gas turbine engine 10, downstream pressure may change from Pa to Pb, as shown in FIG. 3. Once this occurs, the pressure difference at valve 74a will cause valve 74a to move from the opened position to the closed position, and the pressure difference at valve 74b will cause valve 74b to move from the closed position to the opened position. This operation of valves 74a and 74b stops the bleed airflow 66a from flowing through bleed duct 58a, and allows for bleed airflow 66b to flow through bleed port 58b and bleed duct 60a to the turbine manifold 68a.

One skilled in the art will readily appreciate that the same or similar operation may occur with regard to bleed ports 58c, 58d connected to turbine manifold 68b via bleed duct 60b, by operation of delta pressure valves 74c and 74d.

Figure 4:
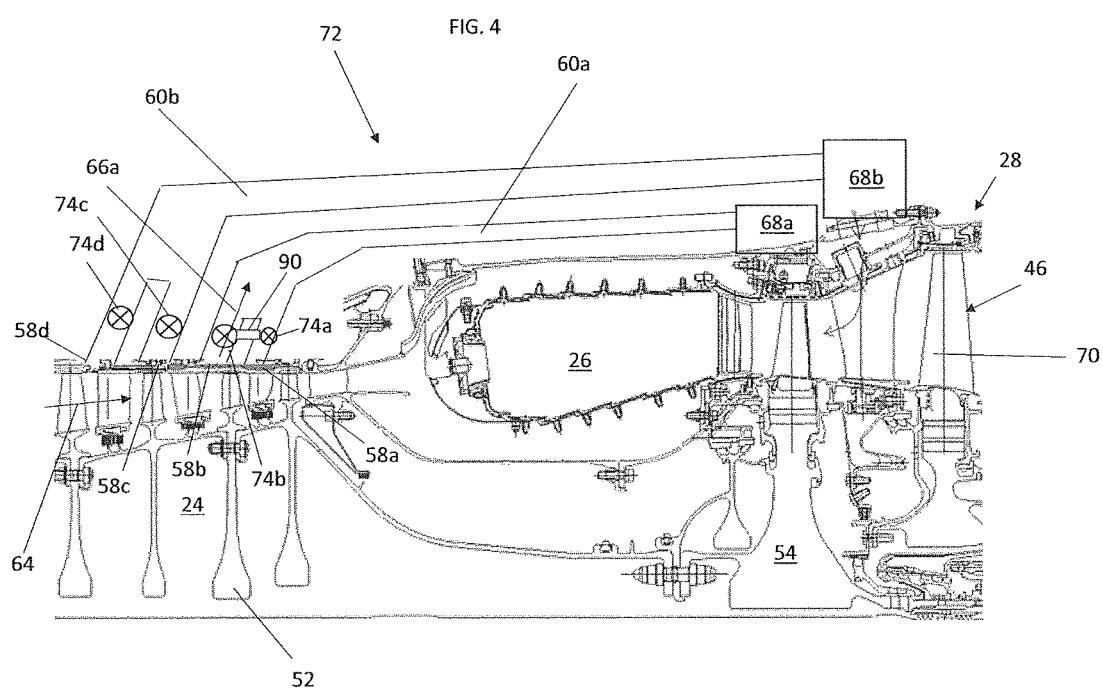
FIG. 4 is another schematic view of an embodiment of a bleed system for a gas turbine engine.

In another embodiment, illustrated in FIG. 4, valve 74a and valve 74b are configured not to operate independently as described above, but are mechanically connected via, for example, a linkage 90. The mechanical connection is such that, for example, when valve 74a is opened via the pressure difference across the valve 74a, the linkage 90 connecting the two valves 74a and 74b forces the valve 74b into the closed position. In some embodiments, the first valve 74a is a delta-pressure valve, and the second valve 74b is not a delta-pressure valve so that the operation of the second valve 74b is controlled by the operation of the first valve 74a via the linkage 90.

One skilled in the art will readily appreciate that while in the embodiments described herein, the bleed airflow 66 is diverted from the high pressure compressor 52, in other embodiments the bleed airflow 66 may be diverted from other compressor locations, such as the fan or low pressure compressor portions of the gas turbine engine 10.

The valves 74a-74d determine the appropriate bleed airflow 66 sources, or bleed ports 58a-58d, thus allowing for the appropriate bleed airflow 66 to be provided to the turbine manifolds 68, based on the operating conditions of the gas turbine engine 10, and automatically switches the bleed airflow 66 sources via operation of the valves 74a-74d as the operating conditions change, as evidenced by a corresponding change in downstream pressure P.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bleed air cooling system for a gas turbine engine, comprising:
   one or more bleed flowpaths operably connected to a bleed outlet to divert a bleed airflow from a gas turbine engine flowpath, each bleed flowpath including:
      two or more bleed ports disposed at separate axial locations of the gas turbine engine to divert the bleed airflow from the gas turbine engine flowpath;
      a bleed duct in fluid communication with the bleed ports and configured to convey the bleed airflow from the two or more bleed ports to the bleed outlet; and
      a delta-pressure valve disposed at each bleed port of the two or more bleed ports, the delta-pressure valve configured to move between an opened position and a closed position in response to a difference between a first pressure at a first location upstream of the delta-pressure valve and a second pressure at a second location downstream of the delta-pressure valve;
      wherein the bleed airflow is selectably conveyed through one of the two or more bleed ports depending on the operation of the associated delta-pressure valve; and
      wherein a first delta-pressure valve at a first bleed port of the two or more bleed ports is mechanically connected to a second delta-pressure valve at a second bleed port of the two or more bleed ports, such that opening of the first delta-pressure valve forces closure of the second delta-pressure valve via the mechanical connection.

2. The bleed air cooling system of claim 1, wherein the delta-pressure valve of each bleed port of the two or more bleed ports is configured to operate passively.

3. The bleed air cooling system of claim 1, wherein the axial locations are axial locations of a high pressure compressor section of the gas turbine engine.

4. The bleed air cooling system of claim 1, wherein the one or more bleed flowpaths are in flow communication with at least one turbine manifold.

5. The bleed air cooling system of claim 1, wherein the one or more bleed flowpaths is two or more bleed flowpaths.

6. The bleed air cooling system of claim 1, wherein the mechanical connection is a linkage.

7. A gas turbine engine, comprising:
   a compressor section;
   a turbine section operably connected to the compressor section; and
   a bleed air cooling system, comprising:
      one or more bleed flowpaths operably connected to a bleed outlet to divert a bleed airflow from a gas turbine engine flowpath, each bleed flowpath including:
         two or more bleed ports disposed at separate axial locations of the gas turbine engine to divert a bleed airflow from a gas turbine engine flowpath;
         a bleed duct in fluid communication with the bleed ports and configured to convey the bleed airflow from the two or more bleed ports to the bleed outlet; and
         a delta-pressure valve disposed at each bleed port of the two or more bleed ports, the delta-pressure valve configured to move between an opened position and a closed position in response to a difference between a first pressure at a first location upstream of the delta-pressure valve and a second pressure at a second location downstream of the delta-pressure valve;
         wherein the bleed airflow is selectably conveyed through one of the two or more bleed ports depending on the operation of the associated delta-pressure valve; and
         wherein a first delta-pressure valve at a first bleed port of the two or more bleed ports is mechanically connected to a second delta-pressure valve at a second bleed port of the two or more bleed ports, such that opening of the first delta-pressure valve forces closure of the second delta-pressure valve via the mechanical connection.

8. The gas turbine engine of claim 7, wherein the delta-pressure valve of each bleed port of the two or more bleed ports is configured to operate passively.

9. The gas turbine engine of claim 7, wherein the axial locations are axial locations of a high pressure compressor section of the gas turbine engine.

10. The gas turbine engine of claim 7, wherein the one or more bleed flowpaths are in flow communication with at least one turbine manifold.

11. The gas turbine engine of claim 7, wherein the one or more bleed flowpaths is two or more bleed flowpaths.

12. The gas turbine engine of claim 7, wherein the mechanical connection is a linkage.

13. A method of cooling one or more components of a gas turbine engine, comprising:
   selectably urging a bleed airflow through a first bleed port of a plurality of bleed ports each disposed at an axial location of a compressor section of a gas turbine engine, the bleed airflow selectably urged through the first bleed port via selective operation of a plurality of delta-pressure valves located at the plurality of bleed ports; and
   flowing the bleed airflow through a bleed duct toward a bleed outlet disposed at a cooling location; and
   wherein opening of a first delta-pressure valve of the plurality of delta-pressure valves forces closure of a second delta-pressure valve of the plurality of delta-pressure valves via a mechanical connection of the first delta-pressure valve to the second delta-pressure valve.

14. The method of claim 13, further comprising:
   stopping the bleed airflow through the first bleed port; and
   starting the bleed airflow through a second bleed port of the plurality of bleed ports via selective operation of the plurality of delta-pressure valves in response to a change in an operating condition of the gas turbine engine.

15. The method of claim 14, wherein for a given operating condition, bleed airflow is conveyed through only one bleed port of the plurality of bleed ports.

16. The method of claim 14, wherein the operating condition is a pressure downstream of the plurality of delta-pressure valves.

* * * * *